July 30, 1957     S. R. CARSON     2,800,731
STEERING WHEEL

Filed Sept. 4, 1953     2 Sheets-Sheet 1

INVENTOR.
Stanley R. Carson

BY

His Attorney

United States Patent Office 2,800,731
Patented July 30, 1957

2,800,731
STEERING WHEEL

Stanley R. Carson, Dayton, Ohio, assignor to General Motors Corporation, Detroit, Mich., a corporation of Delaware Application September 4, 1953, Serial No. 378,559

2 Claims. (Cl. 40—2.2)

This invention relates to hand wheels and more especially to ornamented steering wheels as used in connection with vehicles.

It is an object of the present invention to form a steering wheel including a molded portion which includes an insignia on its surface which is partially embedded therein.

It is another object of the present invention to provide an insert, that is adapted to have portions thereof embedded in the molded portion of a reenforced steering wheel so that an insignia integrally formed thereon will appear in the surface of said portion of the wheel when other portions of the insert are in contact with a reinforcing member within said molded portion.

It is a still further object of the present invention to provide an insert having spacer portions projecting from one side thereof and an insignia portion projecting from and oppositely disposed to the spacer portions of another side thereof so during the wheel molding operation when a portion of said insert is positioned on a wheel reinforcing member, that the spacer portions will contact one surface and the insignia portion will contact another surface of the mold cavity so the portion of the insert in contact with the reinforcing member is embedded in a molded material that surrounds the reinforcing member and the insignia portion will appear in the surface of the material formed in the mold cavity.

In carrying out the above objects it is another object of the present invention to provide a reinforcing member with a predetermined shape so an insert positioned thereon will be maintained in correct alignment therewith when the body portion of a steering wheel is molded about the reinforcing member.

In carrying out the above objects it is another object of the present invention to provide a spacer that is adapted to position the reinforcing member of the wheel within a mold so that an insignia insert when positioned thereon will be correctly positioned with respect to the surface of a molded portion formed about the reinforcing member.

It is another object of the present invention to form an ornamental steering wheel by a method wherein the steps include; positioning a reinforcing member and an insert with a raised insignia portion integrally formed thereon in a mold cavity so a portion of the insignia is in contact with the mold cavity, filling the mold cavity with a moldable material to form a body portion and to partially cover at least a portion of said reinforcing member so a portion of said insert is embedded in said body material, and finally removing the molded body from said mold cavity to provide a steering wheel with an ornamental insignia appearing in the surface of a body portion thereof.

It is a further object of the present invention to form an ornamental steering wheel by a method wherein the steps include; providing a reinforcing member for a steering wheel, providing an insert having an insignia portion projecting from one surface thereof and at least one spacer integrally formed thereon and oppositely disposed to the insignia portion on said insert, positioning said reinforcing member and insert in a mold cavity so a portion of the insignia is in contact with a portion of the surface mold cavity and the spacer is in contact with another surface portion of the mold cavity for maintaining the insignia portion in its desired position, filling said mold cavity with a moldable material so as to embed a portion of the insert and the reinforcing member and to form a molded body portion for said wheel, and finally removing the molded body to provide an ornamental steering wheel having an insignia portion appearing in a body portion thereof.

Further objects and advantages of the present invention will be apparent from the following description reference being had to the accompanying drawings wherein a preferred embodiment of the present invention is clearly shown.

Figure 1:
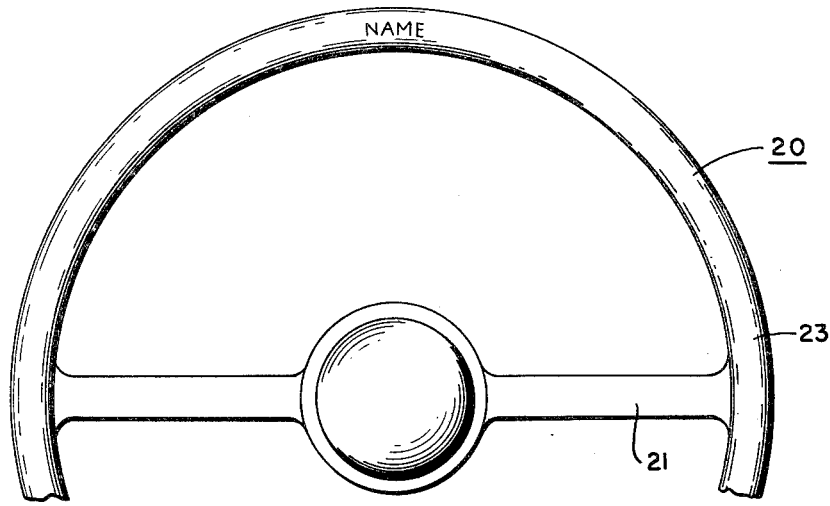
Fig. 1 is a plan view of a steering wheel with an insignia located in a portion of its rim.
Figure 2:
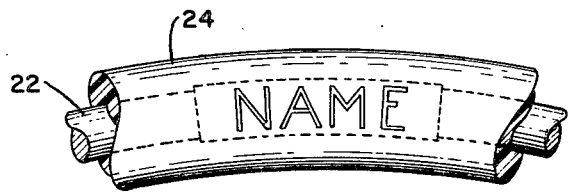
Fig. 2 is an enlarged view of a portion of the steering wheel wherein an insert carrying an insignia portion is embedded in a body portion of the wheel.
Figure 3:
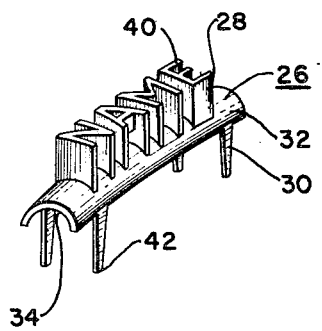

Fig. 3 in perspective shows an insert having a raised insignia portion on one surface and a plurality of spacers projecting from another surface.

Figure 4:
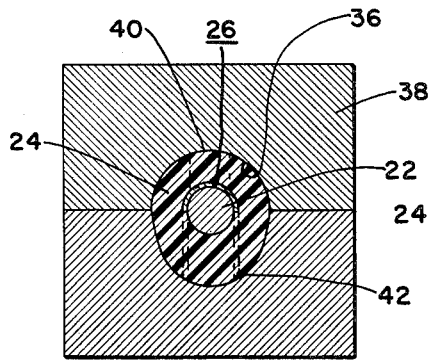

Fig. 4 diagrammatically in section shows a mold cavity wherein the insert in Fig. 3 is positioned on a reinforcing member for the steering wheel.

Figure 5:
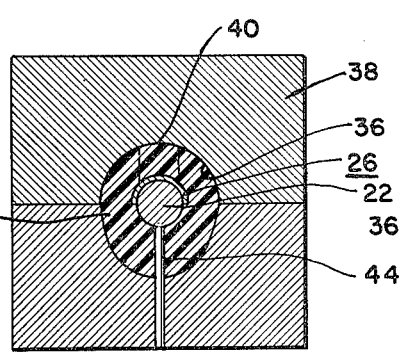

Fig. 5 diagrammatically in section shows a reinforcing member and an insert as positioned in a mold cavity by a separate spacer located in a mold cavity.

Figure 6:
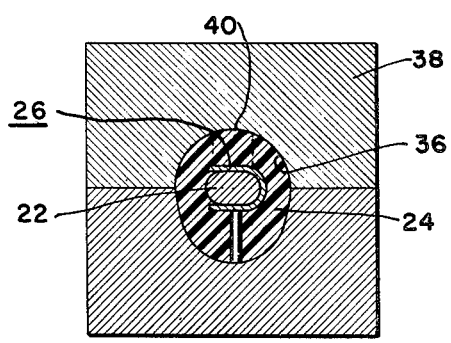
Figure 7:
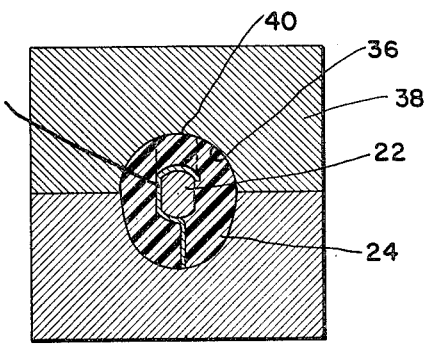

Figs. 6 and 7 diagrammatically show a reinforcing member having a predetermined shape for positioning an insert in a mold cavity.

Figure 8:
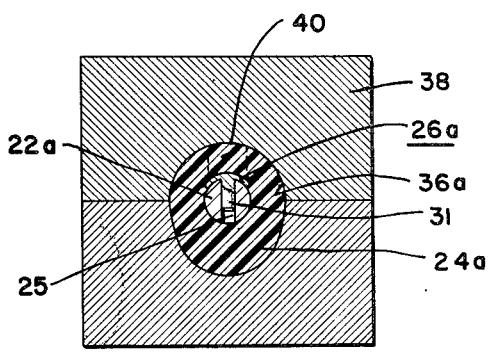

Fig. 8 diagrammatically shows a reinforcing member having a passage therethrough wherewith an insert is positioned.

In the drawings numeral 20 designates a steering wheel having a reinforcing member 22 at least partially covered by a molded body portion 24 to form spokes 21 and a rim portion 23 therefore. In Fig. 3 an insert 26 is shown. This insert 26 is a unitary member and has a body portion 32 whereon a raised insignia portion 28 and spacer elements 30 are formed on opposite sides thereof. The body 32 of insert 26 has a surface 34 that corresponds in shape to the outer surface of the reinforcing member 22 so the insert 26 may be positioned thereon when the insert 26 and reinforcing member are positioned in a mold cavity 36 of mold 38, shown in Figs. 4 to 7.

When the reinforcing member 22 and insert 26 are positioned in the mold cavity 36, the spacer element 30 of insert 26 will have portions 42 thereof contacting a surface portion of the mold cavity 36 and so as to maintain a surface 40 of the insignia portion 28 in contacting relation with other surface portions of the mold cavity 36.

When the respective parts are thus properly positioned in the cavity 36 of mold 38 and a body portion 24 of the steering wheel 20 is molded in the cavity 36 by a suitable method, portions of the insert will be embedded in the body portion 24 while the surface 40 of the insignia 28 not covered by the molding material because of its position during molding will appear in the body portion 24 of the wheel 30 after it is formed in mold 38.

In Fig. 5 of the drawings a separate spacer 44 is used to position the reinforcing member 22 and the insert 26 in mold cavity 36 for the purpose hereinbefore stated.

In Figs. 6 and 7 the reinforcing element 22 and insert 26 each have surface portions suitably shaped so that the insert 26 may be positioned against rotation on the reinforcing member 22 when both are positioned in the mold cavity. This arrangement may be used with either separate or integral spacers, as shown, for positioning the reinforcing element and the insignia, in the mold cavity as in Fig. 6 wherein a separate spacer is used or in Fig. 7 wherein a single integral spacer that is bent around the reinforcing member is shown.

In Fig. 8 another modification of the present invention is shown wherein the insert 26a is positioned on the reinforcing member 22a. In this embodiment the reinforcing member 22a has at least one passage or hole 25 that may extend partially into or entirely through the member 22a so a peg 31 suitably located and integrally formed on insert 26a may extend at least partially into or through the hole 25. Manifestly the peg or a plurality of pegs 31 may engage the surface portions of the mold cavity 36a when the reinforcing member 22a is otherwise suitably supported therein or the reinforcing member 22a may be suitably positioned by other pegs, not shown so that the insert 26a is in correct relation to the mold cavity 36a when the pegs 31 do not contact the mold surface 36a for the purpose hereinbefore set forth.

Manifestly the material is used to form the reinforcing element 22, the body portion 24, and the insert 26 are of little import as any suitable materials such as metals, plastics, wood, etc., may be used provided the surface 40 of the insignia 26 is in the correct relation to the surface of the mold cavity 36 and is in contrast thereto, when the body portion 24 of the wheel 20 is formed. Thus a large portion of the insert 26 will be embedded within the body portion 24 and securely anchor the insignia 28 therein while other portions thereof are exposed and present an ornamental appearance to the wheel. This ornamental appearance may be any suitable design or mark of any color, shape, or size and may consist of any insignia, indicia, mark, name, trademark, trade name, crest, seal, or for that matter, any other shape or form as may be desired in a steering wheel and may have selected portions thereof of different colors so as to further distinguish the insignia from the body of the wheel.

While the embodiment of the present invention as herein disclosed, constitutes a preferred form, it is to be understood that other forms might be adopted.

What is claimed is as follows:

1. A steering wheel having; a reinforcing member having a generally circular cross sectional shape, a molded body portion covering at least a portion of said member, and an insert providing the insignia on the outer surface of the molded body portion of said wheel, said insert comprising; a base portion embracing only a portion of said reinforcing member and embedded in said mold body portion, a raised insignia portion integrally formed on said base portion extending to a surface of said body and means integrally formed with and extending from said base portion oppositely from said insignia portion for positioning said insert relative to the reinforcing member and said surface of said body when said body is formed over said member.

2. In combination with a steering wheel having; a metal reinforcing spider generally circular in cross section with a portion of non-circular cross-section and, a molded body covering at least the non-circular said portion of said spider, an insert having; a base portion at least partly embracing the non-circular portion of the spider and held against rotation about said spider by the non-circular portion, a raised insignia portion integrally formed on and extending upward from said base portion, and means integrally formed with and extending downward from said base portion for positioning said spider and insert in a predetermined position in a mold cavity when the molded body is formed about said spider and insert.

References Cited in the file of this patent

UNITED STATES PATENTS

| | | |
|---|---|---|
| 1,477,466 | Terhaar | Dec. 11, 1923 |
| 2,085,023 | Husted | June 29, 1937 |
| 2,182,389 | Reid | Dec. 5, 1939 |
| 2,367,800 | Rakas | Jan. 23, 1945 |
| 2,586,978 | Murray | Feb. 26, 1952 |